United States Patent [19]

Hicks

[11] Patent Number: 4,935,918
[45] Date of Patent: Jun. 19, 1990

[54] OPTIC SYSTEM USEFUL WITH METAL SERVICE LINES

[76] Inventor: John W. Hicks, c/o Thompson, Birch, Gauthier & Samuels, 225 Franklin St., Boston, Mass. 02110

[21] Appl. No.: 908,362

[22] Filed: Sep. 17, 1986

Related U.S. Application Data

[63] Continuation-in-part of Ser. No. 761,366, Aug. 1, 1985, Pat. No. 4,778,238, and a continuation-in-part of Ser. No. 798,181, Nov. 14, 1985, abandoned.

[51] Int. Cl.$^5$ .............................................. H04B 9/00
[52] U.S. Cl. .................................... 370/4; 350/96.14; 455/611; 455/612
[58] Field of Search ................. 370/1, 3, 4; 455/611, 455/608, 610, 612, 607, 617; 350/96.14, 96.13, 96.15, 96.16; 356/345

[56] References Cited

U.S. PATENT DOCUMENTS

| | | | |
|---|---|---|---|
| 3,604,936 | 9/1971 | Kompfner | 370/4 |
| 3,849,604 | 11/1974 | Benes et al. | 370/1 |
| 4,086,484 | 4/1978 | Steensma | 455/608 |
| 4,302,835 | 11/1981 | McMahon | 370/3 |
| 4,342,907 | 8/1982 | Macedo et al. | 350/559 |
| 4,588,296 | 5/1986 | Cahill et al. | 356/350 |
| 4,607,912 | 8/1986 | Burns et al. | 350/96.15 |
| 4,709,978 | 12/1987 | Jackel | 350/96.14 |
| 4,712,306 | 12/1987 | Cahill et al. | 356/350 |

FOREIGN PATENT DOCUMENTS 0032347 3/1977 Japan .............................. 350/96.14

Primary Examiner—Douglas W. Olms
Assistant Examiner—L. Van Beek
Attorney, Agent, or Firm—Samuels, Gauthier & Stevens

[57] ABSTRACT

An optical communications systems, e.g. a telephone system, comprising means to accept even electrical communication signals from transmitting stations, modulate an optical signal with said signal from the transmitting station and, using time-division-multiplexing (TDM), provide a resultant optical communication signal to a central station which utilizes a frequency-division-multiplexing (FDM) system for handling incoming optical signals before passing the optical communication signals on to a receiving station which utilizes time-division-demultiplexing means and, where necessary, reconverts the optical signal to an electrical communication signal. Particular advantages of the system are that it can handle and switch a very large number of signals and that it can be utilized in a hybrid communications system wherein, for example, users of the system can maintain conventional electrical entrance wiring connections and conventional non-optical telephones and yet interface readily with optical street lines of the system. Particular aspects of the invention are novel modulating and signal-selection devices.

24 Claims, 5 Drawing Sheets

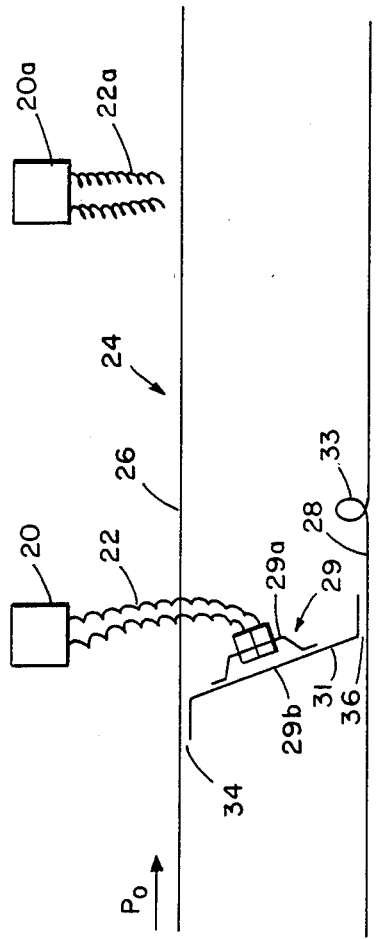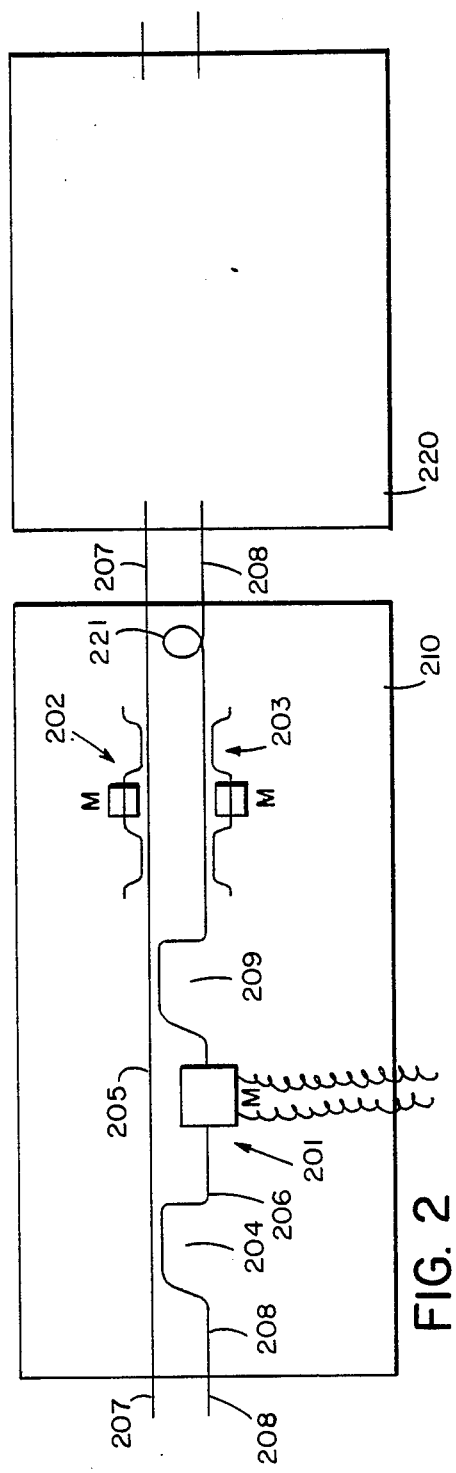
FIG. 1
FIG. 2 ions" filed by John Wilbur Hicks on Nov. 14, 1985.

OPTIC SYSTEM USEFUL WITH METAL SERVICE LINES

RELATED APPLICATION

This application is a continuation-in-part of U.S. patent application Ser. No. 761,366 now U.S. Pat. No. 4,778,238 entitled "Improved Optical Communications Systems" filed by John Wilbur Hicks on Aug. 1, 1985; and a continuation-in-part of U.S. patent application Ser. No. 798,181 now abandoned entitled "Reducing Interference Between Channels in Optical Communications" filed by John Wilbur Hicks on Nov. 14, 1985.

BACKGROUND OF THE INVENTION

This invention relates to communications systems, particularly to optical communications systems such as public telephone systems which must be able to provide substantially simultaneous service to a large number of users of the system.

It is well established that fiber optics provide a promising way to enhance communications and, to some extent, fiber optics systems are even now being incorporated into communications systems. These optic systems are star-network-type systems wherein the transmitter is linked directly to the receiver or, in the case of some trunk lines, where fiber-optics are used in long-line applications as micro-wave transmission is used, i.e. in mere transmission of signals between widely-separated stations.

It has still remained a problem to provide an optical communications system which can interface efficiently with a large number of customers linked directly to a common trunk system. It is a particular problem to provide such a system for the large existing infrastructure of equipment, which is based on electroconductive signal systems, and to do so within acceptable constraints on signal selectivity, power consumption and capital cost.

SUMMARY OF THE INVENTION

It is a principle object of the invention to provide an improved communications system utilizing the attributes of optical fiber systems.

Another object of the invention is to provide an improved optical system utilizing frequency-division-multiplexing as a switching-and-routing means which receives incoming optical signals from transmitter stations and places outgoing optical signals on lines to receiving stations.

Still another object of the invention is to provide a system whereby the advantages of optical fiber communication can be combined with pre-existing electroconductive, metal wire equipment of, for example, telephone subscribers to provide a communications networks which can handle a very high volume of independent communications at one time.

Another object of the invention is to provide improved time-division-multiplexing means for receiving communications from senders onto an optical transmission system.

A further object of the invention is to provide signal modulating means having improved power efficiency.

Another object of the invention is to avoid polarization of signals during modulation of signals in the system.

Still another object of the invention is to provide a time-division-modulating means which avoids cross-talk, or cross modulation, between transmitting stations.

Another object of the invention is to provide rapid high-volume, automatic, optical switching means, e.g. at a central routing office, for transferring incoming signals to receiving stations.

Another object of the invention is to provide a novel and selective optical switch means for acceptance of selected signals for the receiver.

Another object of the invention is to provide a power level maintaining Brillouin amplifier system for use in the system of the invention. Still another object of the invention is to provide an optical communications system of the general type described herein which has a floating-time-slot characteristic whereby transmitting stations have their own time slots assigned, as required, by a central control function and wherein the time slots are only partially defined by the physical characteristics of the transmitting station itself.

Another object of the invention is to provide a system for receiving and modulating signals to be transmitted utilizing an optically reflective interferometer means.

Still other objects of the invention are to provide both time-multiplexing and modulating devices, and, particularly, optical interferometers of the piezovise type and of the mirror type.

Another object of the invention is to provide an improved means for frequency-multiplexing with improved signal discrimination and selection means.

Still additional objects of the invention are to provide improved processes for frequency-multiplexing optical signals and for time-multiplexing of analog signals onto optical transmission line.

Particular objects of the invention are to provide improved modulating devices for use in modulation of optical signals and in selection of signals from optical communication lines.

Other objects of the invention will be obvious to those skilled in the art on their reading of this invention.

SUMMARY OF THE INVENTION

The above objects have been substantially achieved by providing a system including, typically, the following elements:

(a) optical-fiber-type street lines servicing the parties transmitting and receiving communications through the system;

(b) means to provide an optical signal through said street line, a portion of which will be diverted at a modulating station, will be subjected to time-division multiplexing and modulated by electrooptical means responsive to a signal from the transmitting customer to the transmitting station, and thereupon transmitted along optical communication system to a routing-and-switching station;

(c) frequency-division multiplexing means, conveniently associated with said routing-and-switching station, and used to select the optical communications signal generated at the transmitting station from the incoming optical communications line and re-multiplex it onto a central bus;

(d) means to send said re-multiplexed signal along optical lines; and (e) time-division demultiplexing means to select said signal for said receiver. The modulating and time-division demultiplexing means are usually dedicated to given transmitting and receiving station, respectively.

The control logic for operating the system of the invention would normally be associated with and operated by a central office system. By "control office" is meant a central control function somewhat analogous to the "central office" of large telephone systems. It will include the requisite control means to provide the optical signals, e.g. pulses $P_o$, to the optical street lines; provide the synchronization and timing logic for finding appropriate time slots, in real time, required for processing the signals according to the invention and, also, causing the appropriate timing of the operation of the various switches. Of course, the central office function would also include switching and routing logic and other central functions commonly associated with multiplexed communication systems. It is believed that those skilled in the art of operating such communications systems, on reading the present application, would be able to utilize the present level of skill in the art to provide such control logic.

It is, of course, to be recognized that the transmitting station could be any manner of station, not only a telephone. Thus computer communications; output signals from devices associated with meters of various sorts; and output signals from transducers associated with processing equipment or storage equipment all could be serviced by a system as described herein.

It is also to be understood that the system defined herein is descriptive of the sending of a signal from a transmitter, through a routing and switching station, to a receiver. Those skilled in the art will understand that many commercial systems, and certainly conventional telephone systems, will necessarily include additional hardware which is like a "mirror image" of the illustrated system and which carries the other half of a two-way conversation), that is it allows the receivers described herein to communicate with the transmitters described herein.

The street line multiplexing and demultiplexing are done by optical time-division. The switching-and-routing of signals from modulation station to receiver is done by optical frequency multiplexing and is treated herein as a central office function.

Complex piezovises are used in the system described herein. Of course, if polarization-maintaining fibers are used, then single piezoelectric-type vise modulators could be used. The discussion herein assumes use of common optical fibers.

The system described herein utilizes a Brillouin amplification means in conjunction with transfer of communications signals from the incoming lines to the outgoing lines. Other amplification means may be used. For example, laser amplification together with a resonant cavity tap (a frequency-selective tap) could be used to provide the frequency-selective amplification.

In the system, when a sender wishes to talk to a receiver, it is convenient for a central control function, conveniently associated with a "central office", to use appropriate control logic, in response to information furnished by the sender as to what station is to receive his communication, to find a time slot that is unoccupied on the street line of the intended receiver of the message to be transmitted. Also, a frequency channel, f, is selected, usually by the central office, which has not committed to a free pulse position (say the seventh pulse following the synch pulse) on the common bus and which has not been committed to any pulse position on the transmitter's street line. The central office then sends out a $P_{of}$ (a $P_o$ pulse of selected frequency) properly synchronized with respect to the time slot to be utilized by the receiver so that the sender can place his pulse in this previously unoccupied time slot. Thus neither sender nor receiver need be assigned a permanently-fixed time slot because the central office's de facto designation of a pulse $P_{of}$ actually determines the time slot to be selected.

One important aspect of a street-line transfer system is that it uses modulators which are slower than the typical $0.2 \times 10^{-8}$ sec/pulse. Electrical service entrance lines carrying the original pulse may be incapable of carrying $5 \times 10^8$ pulses per second at which the optical transfer lines are to be multiplexed. The $P_o$ pulse is sufficiently short, taking only a short time sample of a relatively slowly-varying signal applied to the modulated street line signal. This type of signal-sampling of time-slices is common in converting analog signals to digital systems where the object is to obtain binary pulses representative of the amplitude of the time slice. However, in the present invention, the amplitude can be transmitted directly.

(Of course, one could convert the sender's original signal to binary form before its modulation. In such a case, there should be at least three and preferably at least five time slices per pulse or, alternatively, the digital signal should be synchronized relative to the pulse, $P_o$).

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 1 is a schematic diagram illustrating the portion of a modulating station which is the interface between a metal wired transmitting station (e.g. a house with conventionally-wired telephone) and the transmission side of optical-fiber transmission lines which are to be used to transmit calls from the transmitting station.

FIG. 2 is a schematic diagram of a complex piezovise interferometer useful in the invention.

Figure 15:
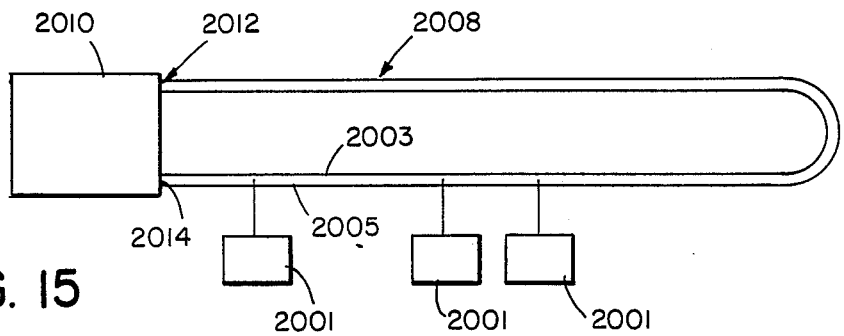
Figure 16:
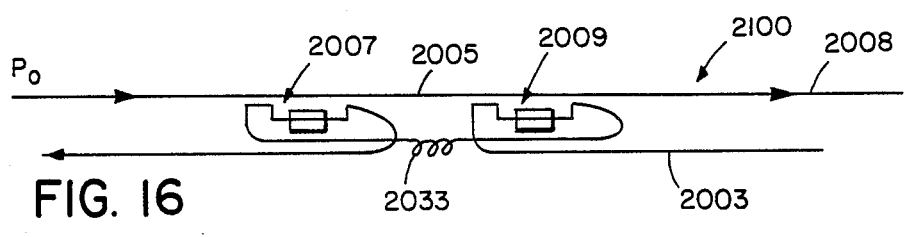

FIGS. 15 and 16 schematically illustrate a backward transfer system useful in the invention.

Figure 17:
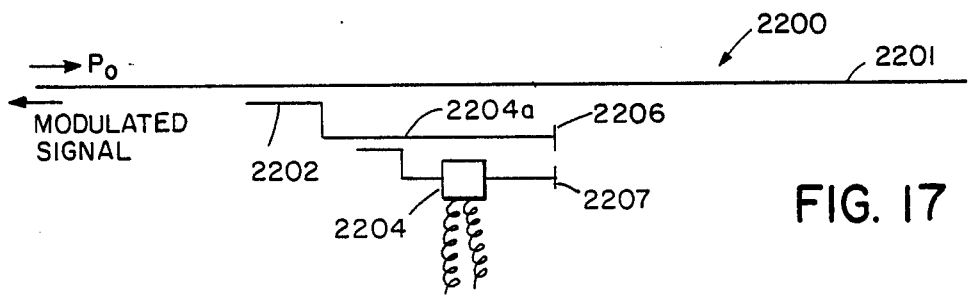

FIG. 17 is a schematic illustration of an embodiment of a reflective modulating system wherein cross-talk at stations downstream from the modulated station is avoided or vastly reduced.

Figure 18:
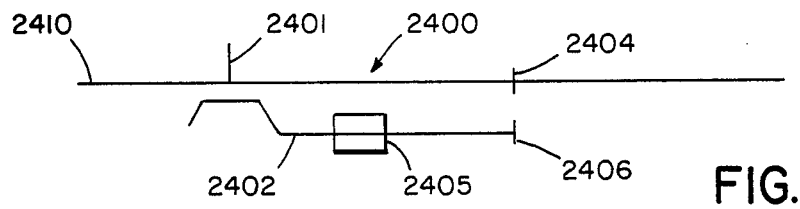

FIG. 18 is a schematic illustration of another embodiment of a reflective-type interferometer useful in backward transfer systems embodying the invention.

TRANSMISSION OF SIGNALS TO STREET AND TRANSFER LINES

For purposes of illustration only, the illustrated system street line pulse system has 100 transmitter stations, uses optical frequency channels each having $5 \times 10^8$ pulses per second. Each frequency channel has 100 time slots, one for each customer. Each transmitter station sends $5 \times 10^6$ pulses per second.

As seen in FIG. 1, the transmitters (e.g. the initiator of a telephone message) are in any of a number of houses 20, 20a which are equipped with conventional electroconductive telephone service wire 22. Service wire 22 from houses 20 and 20a are connected to an optical transmission system 24 which comprises a transmission street line 26, a transfer line 28, and, between them a time-division multiplexing system including a 2-arm piezovise-type (a double vise, as seen in more detail in FIGS. 4 and 5) fiber optics modulating interferometer 29 comprising an arm 29a and an arm 29b. The interferometer serving as means to modulate the diverted portion of an optical signal from the street line and transfer it to the transfer line. A length of optical fiber 33 is built into the system to allow a delay of one time slot in the transferred optical signal relative to the signal on the street line.

The multiplexing and modulating system will normally be packaged together and connected to each of street line 26 and transfer line 28 by achromatic, phase-matched, partial, lateral couples, i.e. fiber optic taps as illustrated at 34 and 36.

These achromatic taps are conveniently selected to transfer, typically, about 1% of the power of the incoming synch pulse ($P_o$) (normally supplied from a central pulse-generating source, e.g. a central office of a telephone system) at each side, thus transferring, in a typical case, about 0.01% of power from street line to transmission line.

On the transmission side of the system, a source synchronization pulse, $P_o$, will proceed out along the street line 26 towards the customers at 20, 20a, etc. A portion of this pulse, of selected frequency, $P_{of}$, is to be subjected to the modulated transfer to transfer line 28. The remaining portion of the pulse proceeds down the street line 26, to successive transmission stations.

When a message is transmitted from a customer (transmitter) station 20, 20a, etc. there will be a modulated transfer of a portion of the pulse $P_o$ from the street line 26 to the transfer line 28, normally at a frequency selected as appropriate by the central office control logic. However, the system also comprises optical processing means to assure that the pulse portion transferred at each station will fall into different time slots. This can be achieved by using optical-signal delay means, e.g. by introducing an additional length 33, of optical fiber in the transfer line (relative to the street line) equivalent to one time slot. (This will be about 40 centimeters of optical line length 33, an amount easily incorporated onto a spool at the modulating station.)

The absolute timing of $P_{of}$ (the optical pulse of selected frequency) can be changed by central office control systems so that, even though a given transmitter station is assigned to transmit in a fixed time slot relative to $P_{of}$, the absolute time can be effectively modified by changing the timing of the occurrence of the $P_{of}$ itself. Thus, in the system being described, there is a floating-time-slot capability whereby each transmitting station can deliver to any "time slot" on the central station bus even though it has a fixed time delay relative to the sync pulse.

Each transmitter station can be adapted to receive (that is tap off the street line for modulation) only a $P_{of}$ of selected frequencies, but in the preferred embodiment each transmitter station transfers and modulates a fraction of the power of all $P_{of}$s in the $P_o$.

It is possible to detect the incoming optical signals in the control office and separate the signal from each station by its time of arrival relative to the sync pulse, and then to switch and otherwise process this detected (electrical) signal by conventional electrical means. In this case only one $P_{of}$ is necessary. However, in a preferred embodiment routing of signals from transmitter to receiver are accomplished without having the central office detect such signals, switch them electrically, and retransmit them optically to the receiver. This can be accomplished by providing a different optical frequency channel for each station in use. Thus there will be frequencies of $P_{o1}$, $P_{o2}$, $P_{o3}$ ... $P_{on}$, if there are n stations in use. The frequency used by each station is not a permanent assignment but only an assignment for that particular call.

At the expense of somewhat diminishing the capacity of the overall system, a fixed frequency can be assigned to each receiver street line. In this embodiment the frequency of the sync pulse $P_{of}$ assigned to a particular transmitter will be the frequency of the street line on which the intended receiver is located.

The transmission of a signal into the system, say by a telephone user, can be accomplished by the signal conversion and modulating means shown in FIG. 1 illustrating the interface between a metal-wired transmitting station and an optical system of street and trunk lines.

A somewhat more sophisticated system with higher power efficiency is shown in FIG. 2.

As seen in FIG. 2, a modulation means for use in modulating signals between a street line and a transfer line at a transmitter station 210 (in a series of such stations 210, 220, etc.) comprises three interferometers 201, 202, and 203 at each transmission station and a length of fiber 221 to serve as "delay means" as described above. These modulating interferometers all comprise dual-vise piezoelectric modulators because the fibers used are not polarization-compensating fibers. (Only a single modulating interferometer 201 is conceptually necessary, but the others help remove the second-order cross-talk between transmitting stations which would otherwise occur with this architecture.)

Figure 3:
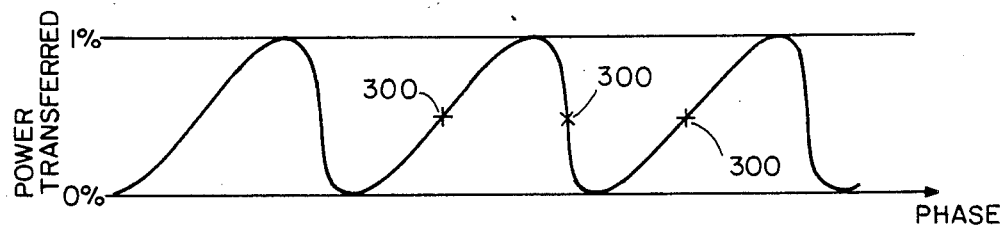
FIG. 3 illustrates a sine function illustrative of how the amount of power transferred at an interferometer, e.g. as that shown in FIG. 2, is dependent on the phase difference between optical couples of the interferometer.

Interferometer 201 has a first, achromatic, phase-matched, partial, lateral, optical tap means 204 to remove signals from street line 207 onto transfer line 208. It permits transfer, in a typical case, of about ¼% of the power (flat across the signal spectrum) from the street line 207 to the transfer line 208. The second optical tap means 209 of interferometer 201 could also transfer ¼% of the power reaching it, but a phase difference between the two interferometer arms 205 and 206 (conveniently achieved by a permanent bias voltage applied to the modulator) will provide means to produce destructive interference such that no light will be transferred. However, the idea is to transfer the amount of light signal still achromatic, that is selected for design purposes. This will usually be about 1%. See FIG. 3 wherein the preferred "zero points" 300 are indicated to achieve such an operating result of interferometer 201. For analog modulation, the device is conveniently operated by adjusting the bias on the modulator to operate about one of the points 300 shown in FIG. 3. This allows a power output from the modulator which is proportional to the signal being transmitted. Normally, the two arms 206 and 205 of the interferometer are nearly the same length, so there is no strong wavelength dependence of the modulation.

Interferometer 202 is operated from the same signal (input signal from transmitter station) as is interferometer 201 but in a reverse sense. By "reverse sense", is meant that when interferometer 201 operates to increase the power transferred, i.e. upon application of a certain voltage, interferometer 202 operating on the same voltage acts to decrease the power transferred.

The sum of the power removed by the interferometer system comprising 201 and 202 from the street line is constant. This prevents transmitting stations down the street line from receiving power (in the $P_o$ pulse) which varies with the modulating action of stations up the street. The present system, shown in FIG. 2 avoids such cross modulation.

Also advantageous in such a modulating interferometer system, as shown in FIG. 2, is the fact that the pulse transferred by interferometer 201 to the transfer line 208 will be transferred back to street line 207 in proportion to the modulation at a second station 220. This is because when the second station transfers 1% of the street line power to the transfer line 208, it also transfers 1% of its power from the transfer line 208 back to the street line 207. Thus, the modulating interferometer 202 is added to work in the reverse sense to interferometer 201 and to remove less power from the transfer line 208 when 201 is removing more from the transfer line 208.

The result of this modulating interferometer system is that modulators 202 prevent the upstream stations like 210 from modulating downstream stations like 220. Conversely, the modulators 203, driven in the same sense as 202, keep the down stream stations like 220 from modulating upstream stations like 210.

There is still the problem of cross-talk associated with triple transfers, e.g. from the street line to the transfer line at one station, back to the street line at a down street station and then back to the transfer line at a station still further down the street. Such higher order cross-talk has a power level of $10^{-4}$ relative to the primary, useful modulated transferred signals. That is to say the triple transferred power is $T^3$ whereas the primary signal is $T^1$. In this illustration T is taken to be 1%. Higher rejection of 3rd order cross talk is achieved by decreasing T.

This complex modulating interferometer system serves as an important compensating means when "time slice" analog modulation is used. It is less important, but still useful, when digital modulation is used.

POLARIZATION COMPENSATION

Figure 5:
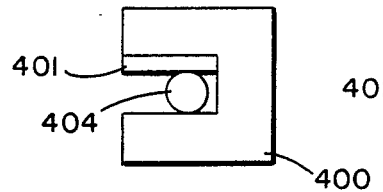
FIG. 5 is a section of the element of FIG. 4 taken along the section 5:5 of FIG. 4.
Figure 6:
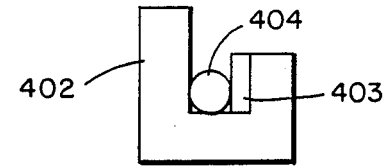
FIG. 6 is a section of the element of FIG. 4 taken along the section 6:6 of FIG. 4.

The modulator means may be a relatively simple piezoelectric clamp as would be described in FIG. 5 viewed alone. The piezoelectric nature of the clamp will allow it to squeeze the optic fiber, say along a length of about one centimeter, to a degree proportional to the voltage input of the communication and obtain a variation in the optical signal transmitted through the fiber which is an optical representation of the communication. This is adequate in polarization maintaining systems. However, when ordinary, monomodal, optical fiber is used, slight perturbations caused by small strain of the fiber will also effect polarization characteristics of the light reaching the modulator. The polarization state of the optical signals at the output of a piezo-modulator does not match the polarization state at the input thereof unless the light is polarized along an axis of the vise.

Therefore, as seen in FIGS. 4 through 8, piezovise-type modulators best used in the system described herein are based on the use of multiple-vise systems whereby a modulator system is provided which will transfer a fraction of the power in the $P_o$ pulse without dependence on the state of polarization of $P_o$ signal as it reaches and passes through, or is processed in, a given transmitting station.

Piezoelectric modulators, really variable-pressure clamps, can serve to modulate the optical signal in response to the electrical pulses received from the electrical transmission wires leading from the transmitter They produce an optical phase change predominantly for a polarization state in which the electric vector is along the squeeze axis.

A preferred modulating means of the invention uses a plurality, e.g. two, of compensating piezo clamps arranged at pre-selected angles, e.g. 90 degrees, one to the other. See FIGS. 4, 5, 6, 7, and 8. The two clamps are driven in the same sense in the FIG. 4-7 case and in the reverse sense in the FIG. 8 case.

Figure 4:
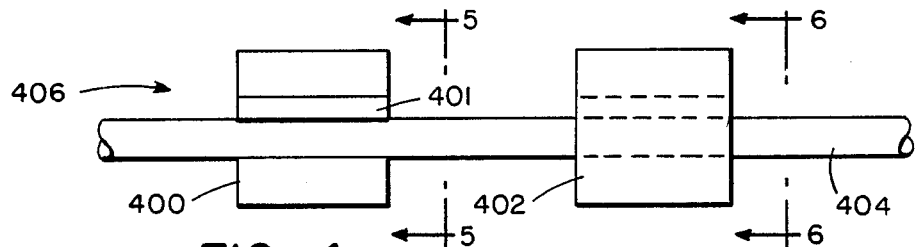
FIG. 4 is an elevation view showing, schematically, the nature of a polarization-compensating double-piezovise modulation element.

As seen in FIG. 4, modulating clamps 400 and 402 of modulator 406 are operated with driving voltages on each clamp adjusted to assure equal modulation on each device. This is a state determined by rotating a plane polarized input beam and adjusting the drive voltage ratio between paired piezo modulators until there is no variation in the modulation of the signal as the polarization plane rotates. In the device 406 shown in FIGS. 4, 5, and 6, the fiber 410 is being clamped, at angles differing by about 90 degrees by piezo clamps 400 and 402. As a practical matter it is probably simple enough to manufacture pre-adjusted pair devices, or pre-adjust them in the factory, before delivering them to the site of installation into a communications system. It is to be noted that the actual piezo materials to which the voltage is applied are defined by pads 401 and 403. Electrodes are normally attached to each face of the pad. The voltage-induced pressure-squeeze on the optical fiber creates a controlled change in optical path length which for the maximum signal voltage and given the vise length, typically about a centimeter, is of the order of one wavelength.

Figure 7:
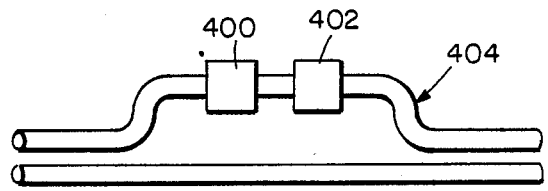
FIG. 7 illustrates an arrangement of a compound piezovise modulation with piezovises on the same arm of the modulating interferometer.
Figure 8:
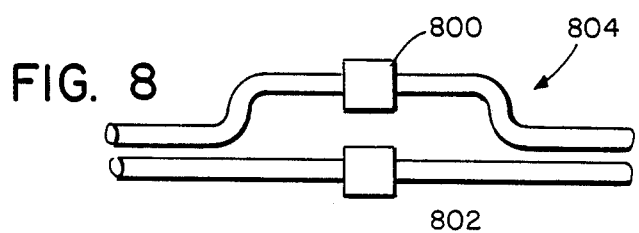
FIG. 8 illustrates an arrangement of a compound piezovise useful in the invention wherein piezovises are on different arms of a modulating interferometer.

An alternative device to that shown in FIG. 7 is seen in FIG. 8 can have one modulator clamp 800 on one arm and the other modulator clamp 802 on the other arm (See FIG. 8). The two piezo clamps 800 and 802 of modulator 804 can be positioned by being rotated around their respective fibers until they are orthogonal and the first clamp is driven in the opposite sense to the first. In this case, the clamps of the dual arm compound-vise modulator will be driven in the reverse sense but will still be able to function as an interferometer such as described with reference to FIG. 2.

The result of these multi-clamp, polarity-compensating modulating devices is to admit modulated optical signals onto the transmission lines, i.e. a fractional portion of the $P_o$ pulse energy as being proportional to the transmitted signal. The timing of this modulated optical signal is a consequence of the differential length of optical fiber (e.g. as at 221 in FIG. 2) along 208.

BACKWARD TRANSFER SYSTEMS

It is to be noted that backward-transfer systems can be utilized at the transmitting stations where message signals are received into the system. Such a system is defined as one wherein the modulated optical signal is transferred back towards the central office in a direction opposite to that of the incoming $P_o$ pulse. FIGS. 15 and 16 schematically illustrate this system at a transmitter station 2001, for a piezo modulating station 2100 utilizing transfer line 2003, street line 2005, modulating interferometers 2007 and 2009 (See FIG. 16), and incremental fiber length 2033. The sync pulse, $P_{of}$, signals can be fed from the central office 2010 from either of the 2012 or 2014 terminals of loop 2008 and hence service will not be interrupted by a single break in the line. Each modulating station of this type can use two interferometers separated by one time slot physically represented by the time-slot equivalent in fiber length 2033 plus the length 2005. The second interferometer decreases cross talk between stations.

Although a large number of specific "backward-transfer" systems are possible, it is preferred to use a reflective system, i.e. one incorporating optical mirror means to achieve the interferometer function. Such a system can utilize a single-fiber modulating system in conjunction with a mirror-type interferometer. (Thus, this type of a reflective modulator can be used in systems wherein a transfer line does not go back to the central office.)

In reflective or return systems the time of return of the modulated signal from a given station is determined by the sum of the line length to the station plus the length back from the station to the control office. This time delay will be many hundreds of time slots. Because of the repetitive pulses $P_{of}$ the relative time slot is then the total time delay less an integral multiple of one hundred time slots. For example, if the line length produces a time delay of 5428 time slots then the slot will be 28.

A general problem for most such reflective, backward-transfer systems would be sensitivity to fiber stretching, e.g. strains as could be caused by wind or other forces acting on conventionally suspended line systems. This problem can be overcome by taking practical steps, e.g. by burying the communications lines. Another problem is that in a general sense, such reflective systems can be vulnerable to cross-talk at stations downstream from the modulated station.

FIG. 17 illustrates one reflective modulating system 2200 for use at a transmitter station which avoids such cross-talk. Street line 2201 is used in conjunction with a modulating system comprising a 1% achromatic power tap 2202, a Mach-Zehnder dual-piezo interferometer tap 2204 but with mirrors 2206 and 2207 on the arms 2205 and 2204a of the interferometer. The interferometer modulates the reflection. Power usage is $0.01 \times 0.01$. There is no cross-talk in this system. The pulse $P_o$ is modulated within the interferometer and a portion thereof which is dependent on the signal from the transmitting station is reflected and sent back along street line 2201.

FIG. 18 shows another reflective-type interferometer 2400 useful in backward transfer systems: The two arms 2401 and 2402 of interferometer 2405 are also approximately equal in length and the modulator varies the relative phase of the two light waves reflected from the two mirrors 2404 and 2406.

The amplitude from a 0.16% mirror 2404 is 0.04; the amplitude of the return beam from the side branch (i.e. from mirror 2406) after coupling back onto the main line 2410 is 0.01. When the two beams are in phase, one obtains a combined amplitude of about 0.5. When they are out of phase, the amplitude will be 0.03. The reflected power, therefore will vary from 0.25% to 0.09%. This is about 25 times as much power as obtained from the system of FIG. 17, an advantage achieved without sacrificing the advantage of reduced cross-talk (cross-modulation).

The art of controlled mirroring of optical fibers is well known Metallic coatings can be used to achieve the desired degree of mirroring. When one wishes to make mirrors of low reflectivity, it is not necessary to use a mirrored coating. Thus, mirrors with say, a 0.16% reflectivity can be achieved by using polished-ends of a fiber with a small gap adjusted to give the desired reflectivity. This will be less than a micron or close to an integral number of half wavelength.

Of course, other modulators known to the art may be used to modulate signals being transmitted into the system. For example, controlled microbending of the transmitting fiber in the modulator by electromechanical means in response to the signal being placed on the line by the transmitter station would result in a controlled modulation of the light sent back to the central station for routing and switching to the appropriate receiving station.

In all cases illustrated, light intensity modulation (intensity of the light beam, i.e. the $P_o$-derived pulse) has been used. Phase modulation, that is modulation of the phase of a light beam supplied along the street line from the control office could be used as well to achieve the desired time multiplexing at the interface of the transmitting station and optical communications lines. Application of such a phase modulation to the system described herein will be understood by those skilled in the art.

While one main advantage of this invention is that it provides a system which does not require the replacement of electrical entrance lines to individual houses and offices etc., it will be understood that its use is not confined to that. For example, an electrical signal in the house can be used to drive a simple L.E.D. and this optical signal can be transmitted by a multimode fiber, of the type known to the art, to the street line, and detected. The detected electrical signal can then be used to drive the modulation in any of the examples shown.

Moreover, the fibers connecting the interferometer to the street and transfer lines in FIG. 1 can be lengthened so that the interferometer can be placed in the house. It is convenient to use a mixture of in-the-house and on-the-pole modulation in old neighborhoods with new construction.

Nothing prevents the use of electro-optic modulators, but their chief advantage is speed and their higher modulation rate is not usable if the signal must be brought in from the house by copper twisted pair which has a relatively low band width.

Stripping pulses from transfer line before re-multiplexing on common bus:

The switching or routing function of the central office is suitably carried out as follows: The incoming optical signals from the transmission side of the system, are carried on transfer lines 28, to the central office at which there are tap means to achromatically remove a fraction of the power from all the optical channels, means to strip off every transferred time slot except the desired time slot carrying the incoming signal to be processed and sent on to the designated receiver, means to select the frequency channel carrying the desired signal, power amplification means and an achromatic tap to multiplex this signal onto a common bus.

Figure 10:
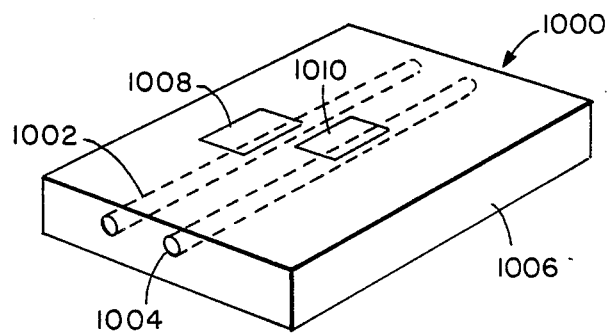
FIG. 10 illustrates a Mach-Zehnder-type timing switch useful in operation of the invention.
Figure 11:
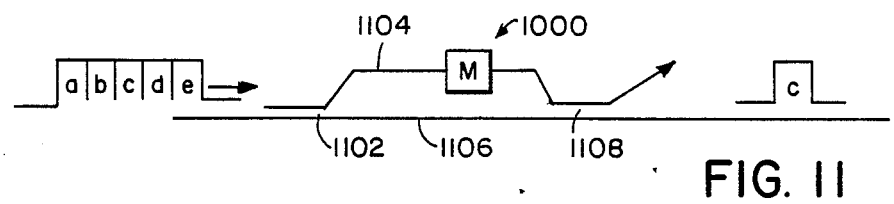
FIG. 11 is a schematic description of the timing switch of FIG. 10.

A device useful for stripping off all undesired time slots is an electroptical Mach-Zehnder device formed on a lithium niobate planar optics device, or the equivalent thereof. Such a device is an electro-optic interferometer means of a general type known to the art. As seen in FIG. 10, a suitable Mach-Zehnder device 1000 typically comprises optical channels 1002 and 1004 embedded in a lithium niobate crystal 1006 and attached to electrodes 1008 and 1010. The electrodes are driven by voltages derived from the timing logic provided from the central office. FIG. 11 shows the device schematically as an interferometer 1000 comprising, conveniently, a 50% lateral coupler 1102, two parallel interferometer paths or "arms", 1104 and 1106, and another 50% coupler 1108. (The paths 1106 and 1104 correspond to the optical channels 1004 and 1002 of FIG. 10.)

The electrodes on at least one of the arms of the device are attached to a voltage A input source. The input voltage applied to the device varies the optical path length of light through arm being operated upon. The resulting phase variation between the two arms can cause substantially all or substantially none of the input light to be carried through the device toward a common bus, e.g. as seen at 908 of FIG. 9.

The control logic of the system will provide that the device, which is really a switch means, is kept off (in a condition permitting no-light flow) until the time slot to be transferred arrives. It is then turned "on" and the light signal from that time slot is permitted through. These electro-optic switching devices have switching times which are short compared to the $0.2 \times 10^{-8}$ per-second pulses to be processed.

In the present disclosure, the resultant "time slices" of the optical signal are not processed to provide a series of binary pulses. Instead the amplitude of the "time slices" of signal are transmitted as is. When the initial electrical signal is in binary form then this system is taking time slice samples of a signal that has only two levels.

The optical amplifiers in the central office's frequency channel-selective transfer switch assembly 902 between a transfer line 906 and a central office bus 908 can be optical frequency-selective means such as a resonant cavity filter system, say 2 or 4 of them in series together with a laser amplifier, or a Brillouin amplifier 900, which both amplifies and selects frequency.

Brillouin amplification of one sort or another has been described in "Electronics Letter", Volume 22, No. 9, in an article entitled Fiber Brillouin Amplifier With Electrically-Controlled Bandwidth; in "Electronics Letter" of May 8, 1986, Volume 22, Pages 556–577 in an article entitled Application of Brillouin Amplification in Coherent Optical Transmission; and in "Electronics Letter" of June 5, 1986, Volume 22, No. 42 entitled Influence of Nonlinear Dispersion in Coherent Narrow-band Amplification by Stimulated Brillouin Scattering.

In general, a laser pump, or some other primary source of narrow-spectral light of sufficient power, is used as a power source for the amplifier. The optical amplification process is achieved within the transmission fiber, e.g. the line between incoming transfer line and the central office bus 909 of FIG. 9, by making use of backward-wave stimulated Brillouin scattering, i.e. the pump feeds energy back down 909 of FIG. 9, the transmission path toward the incoming signal to be amplified.

When utilized as the primary means of channel selectivity, backward Brillouin amplification will require relatively high power because of the spectral width ($5 \times 10^8$ pulses/sec) chosen herein as the line rate. The Brillouin width at a wavelength of 1.3 microns is of the order of $2 \times 10^7$ Hertz. The required power goes up in the ratio of $5 \times 10^8 : 2 \times 10^7$. Thus, the laser pump frequency scanning must be used to transfer the high line rate.

Figure 9:
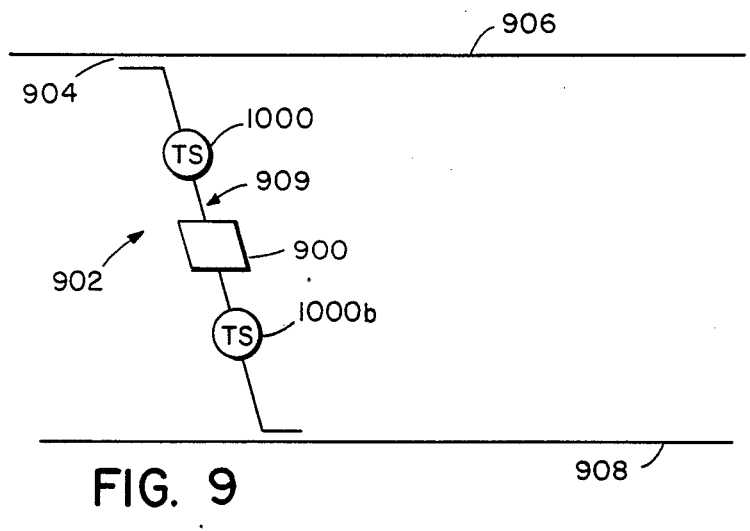
FIGS. 9 and 9A illustrate, schematically, a frequency-multiplexing means useful in the invention and a Brillouin amplifier, useful in such means.
Figure 9A:
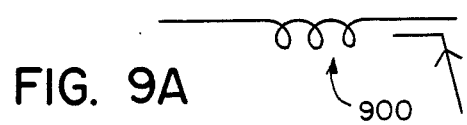

As seen in FIG. 9, a first electro-optic switch 1000 serves as a means to select the appropriate time-slot after the achromatic tap 904 from the transmission line bearing incoming signals to the central office. At this point, there has been no selection of any optical frequency channel which carries the signal in which we are interested. A frequency selective optical amplifier means, such as a Brillouin amplifier 900, is tuned to amplify the frequency channel carrying the desired signal.

Figure 12A:
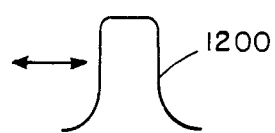
FIGS. 12A and 12B illustrate schematically characteristics of frequency multiplexing means of FIGS. 9 and 9A.
Figure 12B:
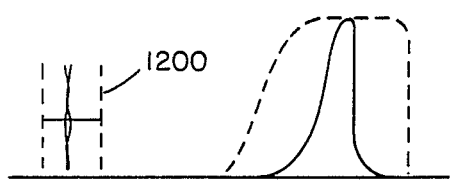

As seen in FIGS. 12A and 12B, the Brillouin spectral line width is increased, such that a pulse of the length used ($0.2 \times 10^{-8}$ sec.) is amplified without undue distortion and rejects (that is, selectively fails to amplify) other frequency channels. The selected time slot at the selected frequency is now introduced onto the bus by way of another achromatic optical tap.

In an alternative device, the Brillouin gain width is not increased and the pulse, C, in FIG. 11 is broadened by the narrow gain width to be about $5 \times 10^{-8}$ seconds long and is more or less Gaussian shaped. This is about ½th times as long as the original sampling cycle or 25 times as long as the original time slots. Therefore, it cannot be crammed into a time slot corresponding to C pulse rate of $5 \times 10^8$ pulses per second. Therefore a second timing switch 1000b of FIG. 9, and identical to the first timing switch, is used to chop this pulse down to a length equal to the time slots on the bus.

In still another embodiment, the repetition rate of the system is increased to $2 \times 10^7$ per second. Now the broadened pulses become a continuous signal which is a reconstruction of the original source signal. Since it is continuous it is not now necessary to use any care in the timing of the $P_{of}$ pulse. The second time switch simply takes out slices from this continuous signal at a time to synchronize into the desired time slot on the bus.

TRANSFER FROM COMMON BUS TO STREET LINE

The pulse selected and transferred to the common central office bus 908 is then transferred to the intended receiver's street line whereon it will be carried to the appropriate receiving station.

TRANSFER FROM STREET LINE (RECEIVER SIDE) TO RECEIVING STATION

The signal on the receiver's street line will be tapped off into a receiving station comprising a detector, e.g. a PIN diode, a timing means providing logic for selecting the communication which we have followed through the system. It is the PIN diode that suitably forms the interface between the optical system and an electrical receiving system although the metal wires from the receiving system itself will suitably be connected to the timing means physically placed between the PIN diode detector and the receiving station.

Figure 14:
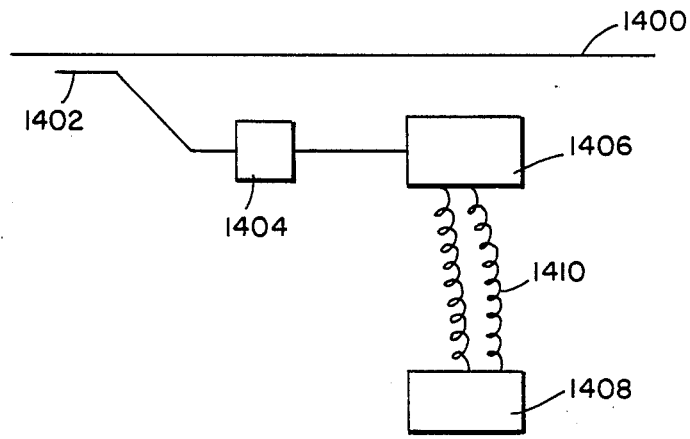
FIG. 14 is a schematic illustration of a typical receiving station for time demultiplexing signals sent from a routing and switching means to a receiver.

FIG. 14 illustrates the system wherein receiver's street line, coming from the common bus at a central office, brings optical signals to an achromatic tap 1402, thence to detecting means 1404, e.g. a PIN diode. Timing means provides the suitable time-slot selection for providing the communications to receiver 1408.

In a typical situation the tap is a 1% partical achromatic tap which removes a fraction of power from all channels on line 1400 and transmits them to detector 1404. Street line 1400 also carries a synch pulse followed by 99 time slots. The synch pulse is used to activate a timing trigger 1406. After a prescribed time interval following the activation, this timing circuit will permit transmission of the communications in the appropriate time slot. This transmission will be as an electrical signal 1410 down the metal service wires to receiver 1408. The transmission can be suitably trimmed of all frequencies higher than $5\times 10^6$ so that the service line will not be excessively burdened. That is to say the electronic device 1406 reconstructs the original signal from the time slices and forwards this signal to the house.

Thus, it will be seen that, in this particular embodiment of the invention, there is used only one synch pulse for the receiver line 1400 and the incoming signal must be caused to fall in a particular time slot, e.g. time slot 7 following the synch pulse.

It is to be understood that this is suitably achieved by timing the original $P_o$ pulse for the desired channel, f, on transmitter's street line A so that it arrives at receiver's street line B at just the right time to get into time slot 7. This accuracy in timing is greatly facilitated by causing all fiber lengths in the entire system to be such that time slots arriving from the transfer line are synchronized with time slots on the common bus and, therethrough, with time slots on the receiver's street lines.

(A) The transmitted signal need not use the entire $5\times 10^6$ per second spectrum. It could send voice (about 3000 Hertz). Such a very "slow" signal would be sampled with such great frequency that it would be faithfully represented on transmission.

(B) Indeed, the transmitter can send a plurality of signals, including multiplexed signals. They will be accepted into the system of the invention if they can be transmitted through the service entrance wires to the street lines and be adequately processed within whatever restraints have been imposed on the particular system, for example by the width and frequency of the time pulse, e.g. the $5\times 10^6$ time-slices, or pulses per second discussed elsewhere in this disclosure.

(C) Moreover, the transmitter can send his signals to more than one station on the receiver side of the system. For example, the signal could be picked off the central bus 908 at two different places and, thereafter, switched to two separate street lines.

In a more complex system, the central office can send two separate frequency channels for use by a single transmitter. If the two $P_o$ signals are non-synchronous so that they appear in different time slots, addressing constraints are reduced and the two signals can be sent to two addresses as distinct electronic messages directly from the transmitter.

Figure 13:
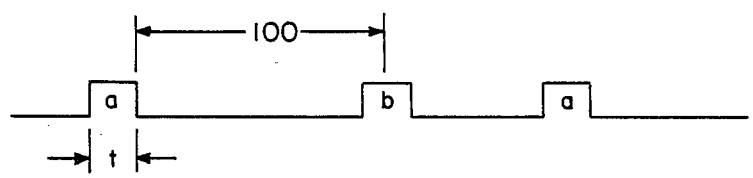
FIG. 13 is a schematic diagram illustrative of how signals from a sender can be received in two different places.

Also, if the transmitter has time-multiplexed two (or more) separate signals before driving the modulator, the central office can route half the pulses to one destination and half to another. Thus, as seen in FIG. 13, signals "a" can be received in one place and signals "b" in another. Where "t" represents $0.2\times 10^{-6}$ seconds and 100 indicates 100 time slots.

(D) Moreover, a receiver can accept two distinct signals from different sources by having its pulse-position-logic pick out two pulse positions instead of one as has been described beforehand.

HOUSEKEEPING

Various kinds of information must be transmitted within the system to assure proper control and coordination. This information may be thought of "broadcast administration" or "broadcast housekeeping" information. Distribution of such information can be carried out in a number of ways. For example, it is convenient to reserve the first pulse in each series of pulses. Also, one or more time slots can be dedicated to carrying such information.

For example, on the receiver side of the system, the central office instructs a specific receiving station, say a Station 38 on a street line D, to receive a call coming in, on pulse position 84 by sending out, onto street line D and in a first pulse position, the number 38 (binary form) followed by the number 84 (binary form). The receiver equipment responds to its name (38() and adjusts its time delay, using the synch pulse as a basis therefor, to select time slot 84.

Similarly, each transmitter station can use a designated time slot to send request and routing information to the central office, e.g. time slot one and in a frequency channel provided specifically and continuously for receiving and transmitting request and routing information.

Those skilled in the design and function of complex communications systems will be able to devise a number of means for providing the necessary administrative control of the system.

What is claimed is:

1. An optical communications system comprising:
   (a) an optical-fiber street line;
   (b) an optical-fiber transfer line;

(c) a plurality of transmitting stations communicating with said street line, at least one of which stations provides an electrical signal;

(d) means to provide a single optical source synchronization pulse through said optical-fiber street line;

(e) electro-optical modulating means to accept electrical signals originating from each transmitting station and to act on at least a portion of said single optical source synchronization pulse from said street line to convert each said electrical signal into a time-divided modulated optical signal;

(f) optical coupling means to transfer each said modulated optical signal to said transfer line;

(g) delay means to cause the signal transferred to said transfer line from any of said transmitting stations to be inserted into a different time slot from that of any signal transferred to said transfer line from any other of said stations; and (h) switching means and routing means communicating with said street and transfer lines for accepting said time-divided multiplexed modulating optical signals and routing same through at least one outgoing optical communications line to at least one receiving station.

2. A system as defined in claim 1 wherein (i) said switching means and routing means comprises filter means for selecting a frequency channel of aid modulated signal, and transmitting said selected frequency of said modulated signal through at least one outgoing optical communications line and thence to signal-receiving stations; and having (ii) means associated with said receiving stations comprising optical-time-division demultiplexing means to select said multiplexed modulated signal transmitted through said at least one outgoing optical communication line and to convert it to an electrical signal.

3. A system as defined in claim 2 where said optical-frequency-multiplexing means of said switching and routing means has, in series, between an incoming transfer line and at least one outgoing optical communication line (a) a first timing switch for selecting time-division-multiplexed modulated signal pulses received from said transfer line;

(b) frequency selective optical amplification means for amplifying a selected frequency channel of said signal pulses selected by said first timing switch; and (c) a second timing switch for selecting a portion of said amplified signal pulses having a length equivalent to a selected time slot.

4. A system as defined in claim 3 wherein said timing switches are Mach-Zehnder devices.

5. A system as defined in claim 4 wherein said frequency selective optical amplification means is a Brillouin amplifier.

6. A system as defined in claim 3 wherein said frequency selective optical amplification means is a Brillouin amplifier.

7. A system as defined in claim 1 wherein said switching and routing means includes:

(a) an achromatic tape coupled to said transfer line to remove at least a portion of said modulated, time-divided multiplexed optical pulse signals from said transfer line and to transfer said signals to a first electro-optic timing switch;

(b) a first electro-optic timing switch coupled to said tap and being operative to allow only modulated, time-divided multiplexed optical pulse signals of a preselected time slot to pass therethrough;

(c) a frequency selective amplifier means coupled to said first electro-optic timing switch, said amplifier means being operative to amplify a preselected frequency of the optical pulse signals permitted to pass through said first electro-optic timing switch;

(d) a second electro-optic timing switch coupled to said amplifier means, said second switch being operative to receive and chop the amplified optical pulse signals of predetermined frequency to a length within said time slot and to pass said chopped optical pulse signals therethrough; and (e) an achromatic tap coupled to said second electro-optic timing switch and to an outgoing optical communications line, said tape being operative to transfer the modulated, time-divided multiplexed, amplified optical pulse signals of preselected frequency from said second electro-optic timing switch to said outgoing optical communications line.

8. A system as defined in claim 7 wherein said frequency selective amplifier means is a Brillouin amplifier.

9. A system as defined in claim 7 wherein each said electro-optic timing switch is a Mach-Zehnder switch.

10. A system as defined in claim 1 wherein said electro-optical modulating means comprises at least one compound piezoelectric vise.

11. A system as defined in claim 10 wherein said electro-optical modulating means is a two-arm interferometer having a piezoelectric vise on each arm thereof.

12. A system as defined in claim 10 wherein said electro-optical modulating means is a two-arm interferometer having a compound piezoelectric vise on a single arm thereof.

13. A system as defined in claim 1 wherein said electro-optical modulating means is comprised of at least three compound piezoelectric vise interferometers as follows:

(a) a first interferometer coupled to said transfer line and comprising (1) two achromatic optical taps for receiving at least a portion of said optical pulse signal from said street line and transferring said signal to said transfer line and (2) a compound piezoelectric vise on said transfer line between said taps, said first interferometer being operably connected to respond to signals send from said transmitting station;

(b) a second said interferometer comprising (1) two achromatic optical taps for receiving said optical pulse signal from said street line and (2) a compound piezoelectric vise between said taps, said second interferometer being operative in the opposite power transfer sense from said first interferometer, to prevent said modulating means from interfering with modulation of modulating means coupled to transmitting stations further down said street line; and (c) a third said interferometer comprising (1) two achromatic optical taps for receiving optical signals from said transfer line and (2) a compound piezoelectric vise between said taps; said third interferometer acting to prevent said modulating means from interfering with modulation of signals modulated by modulating means coupled to transmitting stations further up said street line.

14. An optical communications system as defined in claim 1 or 13 wherein said electro-optical modulating means for use in converting an electrical communications signal to an analogous optical communications signal, comprises
  (a) an achromatic tap for transferring a portion of said optical pulse signal to be modulated from said street line to a modulating fiber;
  (b) a modulating interferometer receiving said electrical communications signal and acting upon said modulating fiber in response thereto, thereby to modulate said optical pulse signal in proportion to said electrical signal; and
  (c) an achromatic tap for transferring the modulated optical signal output of said modulating interferometer from said modulating fiber to an output optical communications line.

15. An optical communications system as defined in claim 14 wherein said modulating interferometer comprises at least one Mach-Zehnder interferometer.

16. An optical communications system as defined in claim 14 wherein said modulating interferometer comprises reflector means.

17. An optical communications system as defined in claim 16 wherein said output communications line is the same optical fiber communications line that communicates with the optical signal and both said achromatic taps are embodied in a single lateral tap device.

18. An optical communications system as defined in claim 17 wherein one arm of said interferometer comprises a Mach-Zehnder device and another arm of said interferometer terminates in an optical-signal-reflective mirror.

19. A system as defined in claim (19) 14 wherein a first arm of an interferometer receives part of said incoming optical pulse signal and is terminated in a mirror and wherein a second arm of said interferometer is connected by an achromatic tap to said incoming optical pulse signal and comprises a Mach-Zehnder device coupled to said electrical communications signal and a second mirror, said second mirror and Mach-Zehnder device defining means to determine the amount of modulation of said optical pulse signal by said interferometer in response to the electrical communications signals being supplied to said Mach-Zehnder device.

20. A system as defined in claim 16 wherein each said electrooptical modulating means comprises a time-delay means for optical signals passing therethrough.

21. A system as defined in claim 1 wherein said modulating means is an optical interferometer means.

22. A system as defined in claim 21 wherein said interferometer is a reflective interferometer.

23. A system as defined in claim 1 wherein said transfer line for carrying said time-division multiplexed modulated optical signal transferred thereto is physically identical with said street line.

24. A system as defined in claim 23 wherein said electro-optical modulating means is a reflective interferometer.

* * * * *